United States Patent
Hamlin et al.

(10) Patent No.: US 6,754,635 B1
(45) Date of Patent: *Jun. 22, 2004

(54) METHOD AND APPARATUS FOR AUTOMATING THE CONDUCT OF SURVEYS OVER A NETWORK SYSTEM

(75) Inventors: Charles B. Hamlin, Southport, CT (US); LeRoy Smith, Jr., New York, NY (US)

(73) Assignee: IX, Inc., Greenwich, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 09/439,382

(22) Filed: Nov. 15, 1999

Related U.S. Application Data

(63) Continuation of application No. 09/034,774, filed on Mar. 2, 1998, now Pat. No. 6,477,504.

(51) Int. Cl.[7] .............................................. G06F 17/60
(52) U.S. Cl. ................... 705/10; 705/1; 705/7; 707/100; 709/217; 455/2.01
(58) Field of Search ................... 705/1, 7, 10; 345/333, 345/524; 710/10, 102, 506, 507; 709/217

(56) References Cited

U.S. PATENT DOCUMENTS

| | | | |
|---|---|---|---|
| 5,297,250 A | 3/1994 | Leroy et al. | 345/333 |
| 5,691,558 A | 11/1997 | Davies | 379/92.01 |
| 5,701,400 A | 12/1997 | Amado | 706/45 |
| 5,802,502 A | 9/1998 | Gell et al. | 705/37 |
| 5,819,282 A | 10/1998 | Hooper | 707/103 |
| 5,848,397 A | 12/1998 | Marsh et al. | 705/14 |
| 5,862,325 A | 1/1999 | Reed et al. | 709/201 |
| 5,893,098 A | 4/1999 | Peters et al. | 707/10 |
| 5,948,061 A | 9/1999 | Merriman et al. | 709/219 |
| 6,070,145 A | 5/2000 | Pinsley et al. | 705/10 |
| 6,093,026 A | 7/2000 | Walker et al. | 434/322 |
| 6,161,059 A | 12/2000 | Tedesco et al. | 700/232 |
| 6,189,029 B1 * | 2/2001 | Fuerst | 709/217 |
| 6,317,649 B1 | 11/2001 | Tedesco et al. | 700/232 |
| 6,513,014 B1 | 1/2003 | Walker et al. | 705/10 |
| 2001/0049621 A1 | 12/2001 | Raposo | 705/10 |
| 2002/0002482 A1 | 1/2002 | Thomas | 705/10 |
| 2002/0016731 A1 | 2/2002 | Kupersmit | 705/10 |
| 2002/0032600 A1 | 3/2002 | Royall, Jr. et al. | 705/10 |

FOREIGN PATENT DOCUMENTS

| | | | |
|---|---|---|---|
| EP | JP 148 457 | 6/1991 | |
| EP | A2 703 540 | 9/1995 | |
| EP | 703540 A | 3/1996 | G06F/17/60 |
| WO | WO96/08779 | 3/1996 | |
| WO | WO99/07144 | 2/1999 | |

OTHER PUBLICATIONS

"*)*4/'7–7 BuyDomains.com 7–74/*)*," http://ww.digital-solutionsinc.com/virt_host.cgi, retrieval date Mar. 16, 2000.
"Interactive Survey," http://www.interactivesurvey.com, retrieval date Mar. 16, 2000.
"Do–It–Yourself Surveys," http://ww.busreslab.com/ev.htm, retrieval date Mar. 16, 2000.

(List continued on next page.)

Primary Examiner—Raquel Alvarez
(74) Attorney, Agent, or Firm—Hickman Palermo Truong & Becker LLP; Brian D. Hickman

(57) ABSTRACT

A method and apparatus for automating surveys over a network system causes an interface to be displayed to a particular client of the network system. This interface can be used by the particular client to define a survey. In response to the client interacting with the interface, a sequence of steps is automatically performed. The sequence of steps includes generating a survey based on information received over the network system from the particular client interacting with the interface; fielding the survey to a group of target users on the network system; gathering results of from network users participating in the survey; and providing the particular client, over said network system, with data that reflects the results of the survey.

50 Claims, 7 Drawing Sheets

OTHER PUBLICATIONS

"Automated Service for Internet Surveys Ushers in New Era of Fast, Easy and Affordable Market Research; Eliminates Need for Survey Software, Programming and Administration," Feb. 25, 1998, Sausalito, CA, http://www.surveybuilder.com.

"Computer Magazine Archive," http://cma.zdnet.com/texis/cma/cma/+urve_5yOXFqtvX9vKKDzmwwwm1Fqnh . . . /display.htm retrieval date Feb. 29, 2000.

"Infotrieve Online," http://www3.infotrieve.com, retrieval date Mar. 16, 2000.

"ClickToMarket Home Page," http://www.clicktomarket.com/home.html, retrieval date Mar. 16, 2000.

Declaration of Jody Powlette, dated Mar. 22, 2000.

Letter from Ari Kahan (Attorney for David Zotter) dated Mar. 26, 1999, regarding a Project FREEFORM.

"Informative, The Real–Time Information Network," http://www.surveybuilder.com, retrieval date Mar. 16, 2000.

"Informative, The Real–Time Information Network," http//www.informative.com/survey_builder/benefits.html, retrieval date Feb. 29, 2000.

"Informative, The Real–Time Information Network," http://www.surveybuilder.com/survey_builder/how_it_works.html, retrieval date Mar. 16, 2000.

"Archives–Corporate PC," http://www.computercurrents.com/magazine/national/1609/crpc 1609.html, retriveal date Feb. 29, 2000.

"World Wide Web Survey Assistant—Software for Internet Surveys & Tests," http://or.psychology.dal.ca/~wcs/hidden/home.html, retrieval date Jul. 5, 2000.

"Online and disk–by–mail surveys, Senecio Software Inc., ePoll, CATI, CAPI, FloStat, cyber . . . ," http://www.senecio.com/, retrieval date Jul. 5, 2000.

Raosoft Product Information, http://www.raosoft.com/products/index.html, retrieval date Jul. 5, 2000.

MessageMedia Home Page, http//www.messagemedia.com/, retrieval date Jul. 5, 2000.

"Simply Surveys," http://www.wsmart.com/simplysurveys/, retrieval date Jul. 5, 2000.

"Computerizing tests, assessments, tutorials and surveys with Question Mark," http://www.questionmark.com/, retrieval date Jul. 5, 2000.

"Surveytool 1.0 User's Guide, Part No. 801–5059–01, Revision 2.0" Surveytool 1.0 User's Guide, Mar. 1, 1993, XP002073635.

\* cited by examiner

Please select the type of question you wish to ask

| Question Type | Number of Items | Format |
|---|---|---|
| ○ Open End | 1 | Text Box ▷ |
| ○ Yes/No | 1 | Radio Button ▷ — 324 |
| ○ Purchase Intent | 1 | Radio Button ▷ |
| ○ Agreement | 1 — 322 | Radio Button ▷ |
| ○ Satisfaction | 1 | Radio Button ▷ |
| ○ Importance | 1 | Radio Button ▷ |
| ○ Value | 1 | Radio Button ▷ |
| ○ Single Select List | 4 | Drop Down ▷ |
| ○ Multi-Select List | 4 | Check Box ▷ |

Now, enter the completing phrase in the text box below:

[ Submit ] [ Reset ]

1. Using the following scale, how frequently do you read the newspaper? (Select one).
   - o Every day
   - o Once a week
   - o Once a month
   - o I do not read any newspapers 2. Which newspapers do you read? (Select all that apply).
   - ☐ New York Times
   - ☐ Wall Street Journal
   - ☐ USA Today
   - ☐ Other
   - ☐ None of the above 3. Would you be interested in receiving a free newspaper? (Select one).
   - o Yes
   - o No 4. What would encourage you to subscribe to another newspaper?

[Submit] [Reset]

The parameters you have selected for your study include:
Number of Questions:     15
Target Group:            Females ages 21-45
Number of Completes:     200
Days in the Field:       2

The price for your survey is  $1,500.00 USD  —502

504— Change Questions — Alter the number of questions

506— Change Target — Alter the target group

508— Change Completes — Alter the number of desired completes or days in the field 510— Survey Wizard — Accept and continue being guided through the process by Survey Wizard

FIG. 5

METHOD AND APPARATUS FOR AUTOMATING THE CONDUCT OF SURVEYS OVER A NETWORK SYSTEM

This application is a continuation of Ser. No. 09/034,774, now Pat. No. 6,477,504 filed by Charles B. Hamlin and Leroy Smith, Jr., on Mar. 2, 1998, entitled "Method and Apparatus for Automating the Conduct of Surveys over a Network System" which is hereby incorporated by reference in its entirety.

FIELD OF THE INVENTION

The present invention relates to a method and apparatus for automating the conduct of surveys over a network system.

BACKGROUND OF THE INVENTION

Before proceeding with a particular product, service, strategy, or tactic, it is often desirable to obtain information about the behaviors, opinions, and attitudes of the marketplace. These data will often help predict if potential customers will be interested in acquiring the product or service or how they may react to a given strategy or tactic.

Research plays an important role in understanding the current and future wants, needs, and behaviors of the marketplace. It is often applied in business-to-business and business-to-consumer applications. As a result, many companies invest a significant amount of money, time, and resources in market research programs.

Typically, if someone (a "client") requires a better understanding of the market place, they will obtain information using an in-house market research department, an out-of-house third party market research firm, or both.

To obtain the requested information, individuals within research groups typically perform a series of linked steps. For example, these steps may include:

(1) working with the client to define the problem;

(2) designing a research instrument (i.e. a survey);

(3) creating the research instrument (writing/producing the survey);

(4) fielding the instrument using mail, telephone, in-person or Internet-based media;

(5) processing the data obtained and analyzing the results; and (6) generating a report of findings for the client.

In defining the business problem, a client generally specifies a set of parameters that defines the information the client needs to know, a particular target group of interest, a time frame, and a cost for the conduct of the research. For example, a client may want to know within three weeks, the flavor of toothpaste that is most liked by kids between the ages of six and thirteen.

Understanding the needs of the client, the market research professional or company develops a research solution to obtain the necessary information within the client's given constraints. The research solution typically involves a series of steps that may include creating a survey instruments and fielding to several hundred people by phone or mail to better understand the needs, behaviors, attitudes and opinions of the client's targeted group.

In general, market research is conducted using one or more of the following communication media:

(1) Mail (2) Telephone (3) In-person (4) Networks including the Internet, e-mail and the World Wide Web Using the first method, the research group mails surveys to a predetermined number of people who fall within the target group. This method of surveying includes such steps as printing surveys, addressing envelopes, stuffing envelopes with the survey, depositing surveys into a mail system, and then waiting for the target group to mail back responses. Once the responses are received, they are processed, coded, and entered into a computer to be analyzed. The analyzed data is then interpreted and reported back to the client.

A drawback associated with conducting research using mail is that it generally takes eight to twelve weeks from the time a project is initiated to its completion. In many cases, this delay is prohibitively long and unacceptable in today's competitive market where business decisions often have to be made in days—not weeks. In addition, the cost of producing, printing, and mailing surveys as well as analyzing the results of the survey can impose a substantial financial burden on many clients.

One approach to reducing the excessive delays that are inherent with mail surveys is to conduct surveys using telephone services. Conducting surveys via the telephone service minimizes the delays associated with mail, but the cost of hiring quality interviewers makes telephone surveying very expensive, thus imposing a substantial financial burden on many clients.

A third medium used for collecting survey data is in-person interviewing. As with telephone, the cost of in-person interviewing can be extremely costly, thus imposing an even higher financial burden on many clients.

A fourth and emerging medium for conducting research is the Internet and other networks. While they offer advantages of speed and lower costs, they reach a small percentage of the consumer and business public (approximately 25% of households and 30% of business) making it difficult to cost effectively find and interview targeted consumers and customers.

Finally, the time and cost of conducting research are often increased by the number of people and steps involved in the traditional research processes. Clients must often work through time consuming and expensive research bureaucracies; engage outside specialists or resources; find targeted respondents; and then wait for surveys to be created, fielded, and processed. The long sought after ideal of having business decision makers be in close and timely contact with their markets is thwarted by traditional systems, methods, organizations and norms.

It is clearly desirable to provide mechanisms and processes that decision makers and researchers alike can use to both quickly and economically reach out and understand the behaviors, opinions and attitudes of consumers and customers in today's competitive and fast moving market place.

SUMMARY OF THE INVENTION

According to one aspect of the invention, a method and apparatus for automating the conduct of surveys over a network system is provided.

According to the method, an automated survey mechanism causes an interface to be displayed to a client which allows the particular client to define a survey. In response to the client interacting with the interface, a sequence of steps is automatically performed. The sequence of steps includes generating a survey based on information received over said network system from said interface; fielding the survey to a group of target users on the network system; gathering results of the survey; and providing the particular client with data that reflects the results over said network system.

BRIEF DESCRIPTION OF THE DRAWINGS

The present invention is illustrated by way of example, and not by way of limitation, in the figures of the accompanying drawings in which like reference numerals refer to similar elements and in which:

FIG. 3 is an example of an interface page that can be used by the user to generate questions and responses in defining a survey;

FIG. 4 is an example of different response types that may be associated with a particular question in accordance with the present invention; and FIG. 5 is an example of the real-time pricing capability associated with the invention.

DETAILED DESCRIPTION OF THE PREFERRED EMBODIMENT

A method and apparatus for automating surveys over a network system is described. In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

Hardware Overview

Figure 1:
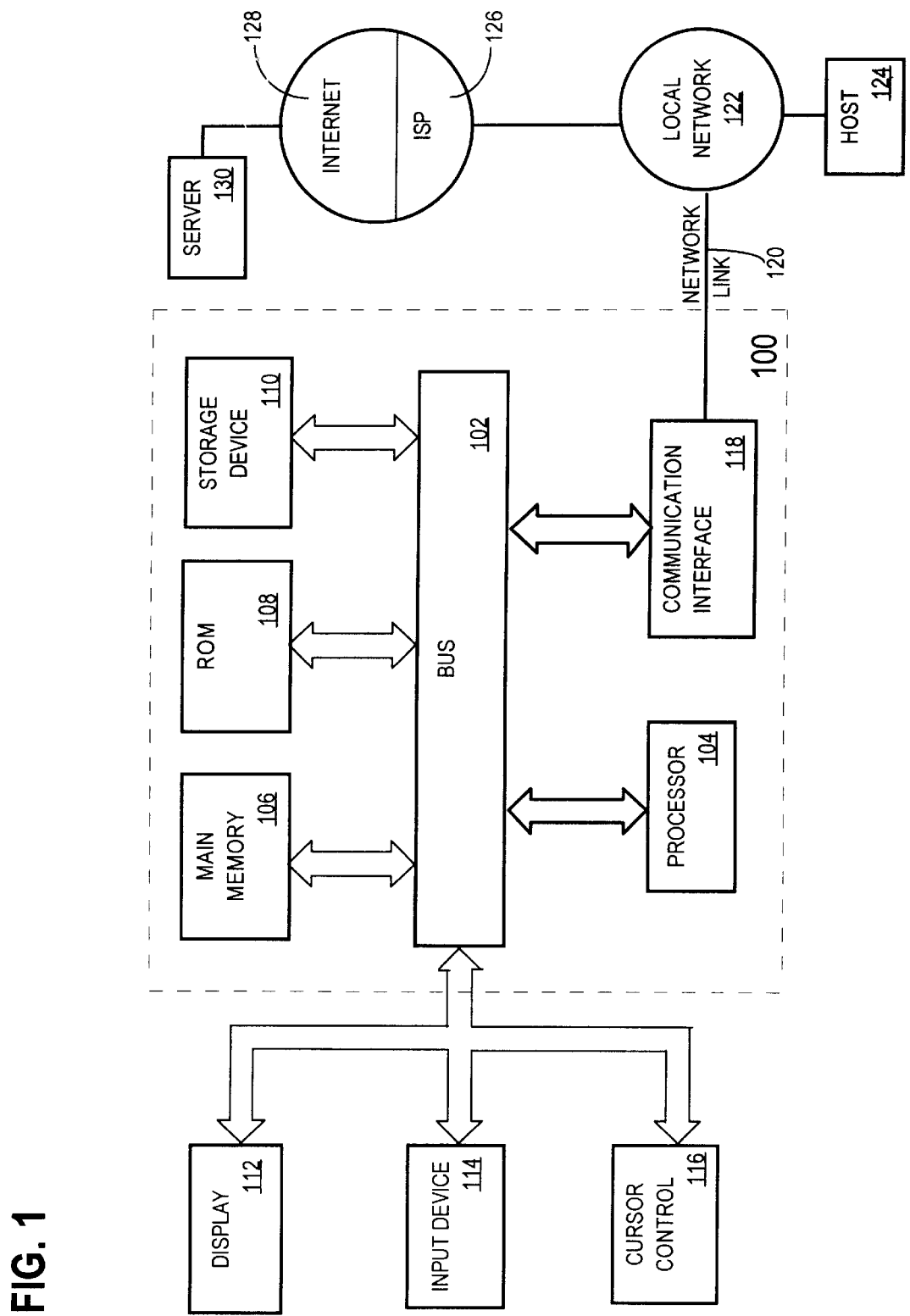
FIG. 1 is a block diagram of a computer system upon which an embodiment of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for automating surveys over a network system. According to one embodiment of the invention, the automation of surveys over a network system is provided by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for automating surveys over the network system as described herein.

The received code may be executed by processor 104 as it is received, and/or stored in storage device 110, or other non-volatile storage for later execution. In this manner, computer system 100 may obtain application code in the form of a carrier wave.

Functional Overview

In accordance with the present invention, an automated survey mechanism provides an interface that enables a client to define, target, field, and receive results from a particular survey. This interface typically consists of one or more individual interfaces that are provided to the client over the network system. In certain embodiments, the interfaces are provided using HTML page formats and are provided to the client via the Internet or other networks. In certain embodiments, the interface is presented to the client via Java Script, Applets, Word processors, or other software programs. By interacting with the interface, the client has the ability to define a particular survey, select the target audience for the survey, learn the price of the survey, and define other pertinent parameters. Once completed, the survey is automatically created and fielded to a particular group of network users (target group or respondents) who are connected to the network system. Results from the survey are quickly and automatically gathered as network users (or respondents) complete the survey. The gathered results are automatically processed, analyzed, and data and charts that reflect the survey results are sent to the client.

Figure 2A:
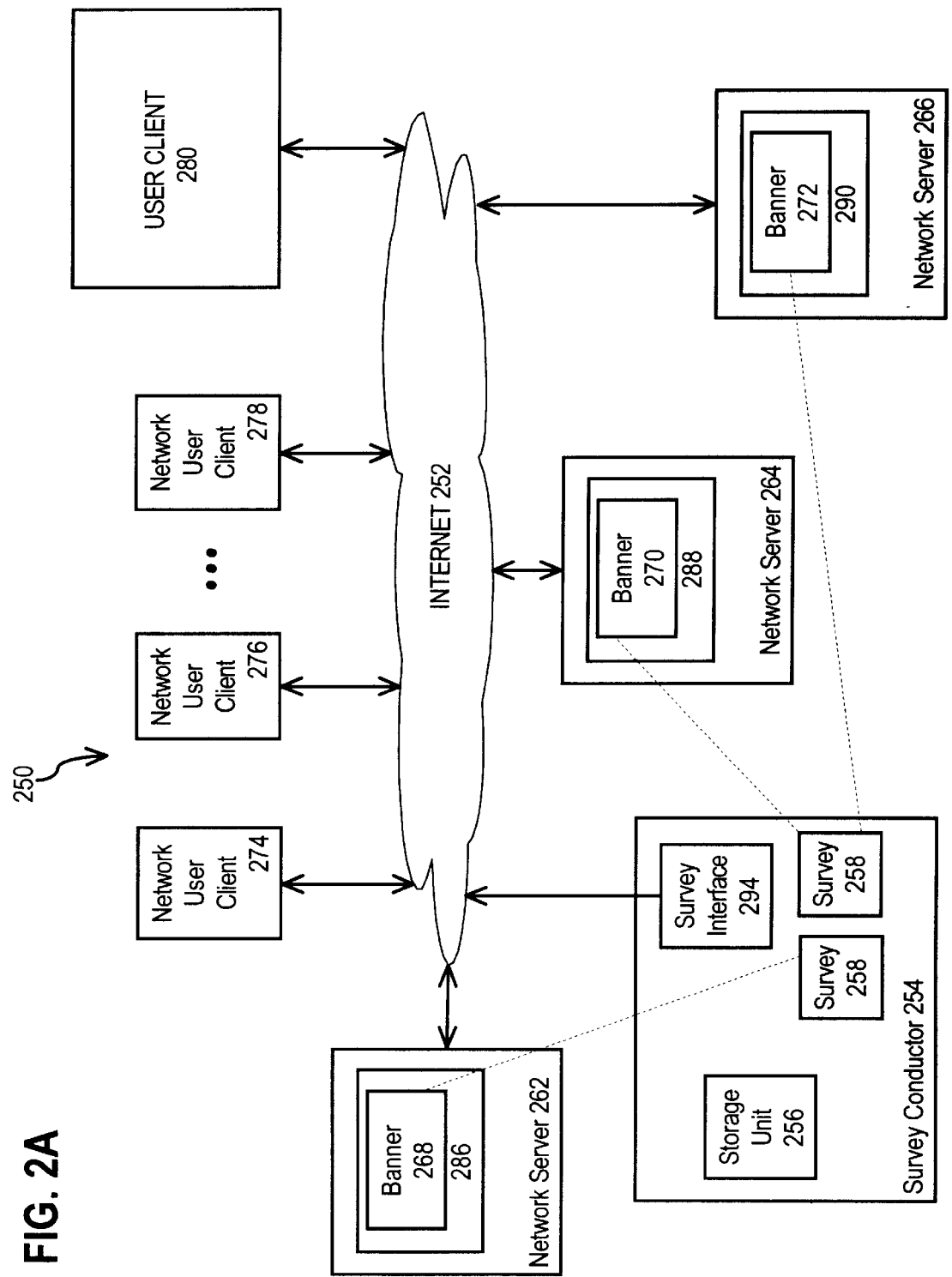
FIG. 2A is a block diagram of a computer system context.

FIG. 2A illustrates in block form an example of the parties and systems involved in this context. In FIG. 2A, a client 280 is coupled either directly or indirectly to the Internet 252. For example, a client 280 may be connected to Internet 252 through a local area network, an Internet Service Provider, an Online Service Provider such as AOL, a proprietary server, or any combination thereof. The user client 280, and the other clients referenced in this description, are end station devices such as a personal computer, workstation, network computer, etc. In the preferred embodiment, the client 280 and other clients have a processor that executes an operating system and a browser program under control of the operating system. The browser program is an industry-standard World Wide Web browser, such as Microsoft Internet Explorer®, Netscape Navigator® or NCSA Mosaic.

Connected to the Internet 252 is a plurality of network user clients 274, 276 and 278. By interfacing with network user clients 274, 276 and 278, network users can access, display and interact with Web pages that are contained on servers that are coupled to Internet 252.

Through Internet 318, user client 280 and network user clients 274, 276 and 278 can connect to the survey conductor server 254. Preferably, client 280 and network user clients 274, 276 and 278 communicate with the survey conductor server 254 using industry-standard protocols such as Transmission Control Protocol (TCP), Internet Protocol (IP), and Hypertext Transfer Protocol (HTTP).

The survey conductor server 254 contains a survey builder 294, a storage unit 296 and a plurality of surveys 256, 258 and 260. Survey builder 294 contains interface data that defines an interface that can be used to create a survey. For example, if a client requests to define a survey, the survey builder 294 automatically sends interface data over Internet 252 to cause an interface to be displayed on the browser executing on user client 280. The client then interacts with the interface to create a survey. The plurality of surveys 256, 258 and 260 represent surveys that have previously been created using survey builder 294. Storage unit 256 is used to store survey results. As network users participate in the surveys, the results are automatically stored in the storage unit 296.

Also coupled to Internet 252 are network severs 262, 264 and 266 each respectively storing data that defines a set of Web pages 286, 288 and 290. The Web pages 286, 288 and 290 may be defined using a variety of methods and formats such as HTML, Java Script, Applets, Word processors, or other software programs. Contained within the set of Web pages 286, 288 and 290 are banners 268, 270 and 272 which may also be defined using a variety of methods and formats. As indicated by the dashed lines, the banners 268, 270 and 272 contain hypertext links to surveys 256, 258 and 260. By selecting a banner, a network user client is automatically provided with a corresponding survey.

Defining a Survey

When a client requests a survey be built, the client is provided with interface data that causes an interface to be displayed on the client's display unit (i.e. computer monitor, television set, etc.). Various mechanisms may be used to present the interface to the client. For example, the client may execute a locally-stored program that generates the interface, or a dynamically delivered JAVA Applet that generates the interface. For the purpose of explanation, embodiments of the invention shall be described in which the interface is delivered to the client in the form of one or more HTML pages. However, the present invention is not limited to any particular mechanism for presenting the interface to the user.

Once the client is presented with the interface, the client may interact with the interface to perform the steps of:

(1) defining a survey
(2) identifying a target group of network users or respondents for fielding the survey, the number of required responses, and the timeframe for their response);

(3) calculating the price for the survey;
(4) indicating where the survey result data is to be sent;
(5) confirming the request and entering pertinent payment information.

Figure 2B:
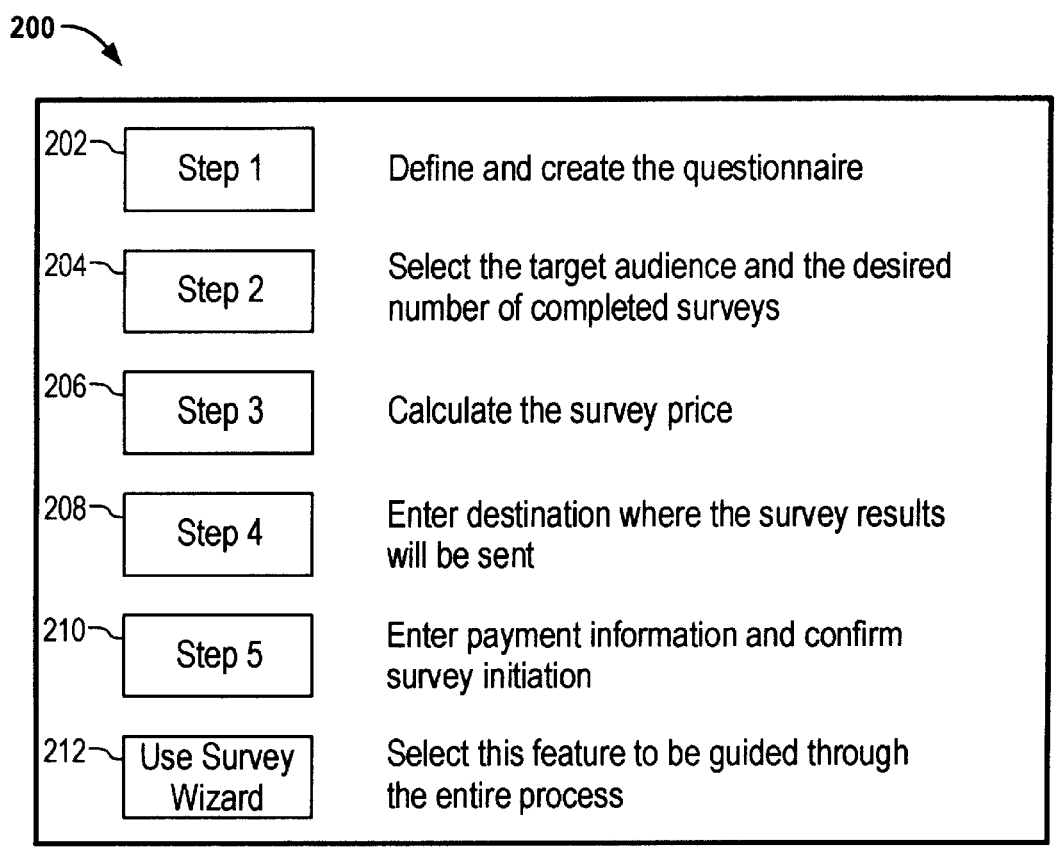
FIG. 2B is an example of a top-level interface page in accordance with the present invention.

FIG. 2B illustrates an example of a top-level interface page 200 in accordance with an embodiment of the present invention. As depicted in FIG. 2B, the top-level interface contains six buttons 202, 204, 206, 208, 210, and 212. Each of the six buttons is linked to other interfaces which can be accessed by the client to cause the automation of a survey over the network system. For example, selecting button 202 causes an interface to be displayed that allows the client to enter/select questions and responses for defining a survey; selecting button 204 causes an interface to be displayed that allows the client to select a particular target group or respondents for fielding the survey; selecting button 206 causes the price of the survey to be displayed to the client, facilitating the alteration of study and pricing parameters; selecting button 208 causes an interface to be displayed that allows the client to enter a destination to which the results of the survey are to be sent; selecting button 210 causes an interface to be displayed that allows the client to enter payment information for the automated processing of the survey as defined; and selecting button 212 enables the user to execute a process that "walks" clients through the interfaces so that they may easily use the automated survey mechanism.

FIG. 3 illustrates an example of an interface 300 that is displayed when the client selects button 202, in accordance with an embodiment of the invention. In this example, interface 300 includes a question entry box 320 that allows a client to complete a phrase or enter a question that is to be used in defining a survey. Also included in interface 300 are exemplary response buttons 302–318. The response buttons 302–318 correspond to a particular question type that may be selected for the question that is entered in question entry box 320.

To aid the client in developing questions (i.e., choose the appropriate question type for the particular issue to be addressed, etc.), the client is provided with helpful hints, guidelines, and examples. These helpful hints and guidelines are typically provided through the use of suggested question types that are frequently used in the field of market research. For example, in defining the survey the client may be provided with hints and guidelines for the phrasing of questions to limit bias and minimize the risk of offending network users, the proper ordering of questions to create a logical and easy-to-answer survey, etc.

By selecting a particular question type button, the client begins the question definition process. For example, in certain embodiments when the client selects the question type button 308 (question type of "Agreement"), the client is presented with the introductory phrase:

"Using the scale below, please indicate how strongly you agree or disagree with the following statement: . . . "

The client may then enter text to complete the question as desired. In certain embodiments, the client has the option to overwrite the entire introductory phrase to create their own custom question.

After the client has completed the question, they are then presented with appropriate responses relevant to the selected question type. For example, in selecting the response button 308 for the response type "Agreement," the client is presented with the following default responses:

(i) Strongly Agree
(ii) Agree
(iii) Neither Agree nor Disagree
(iv) Disagree
(v) Strongly Disagree
(vi) Don't Know In certain embodiments, the client can add, delete, or change one or more of the default responses associated with a particular question type as deemed appropriate by the client. For example, the client may decide to change the response (iii) from "Neither Agree nor Disagree" to "Neutral," or simply delete the response (vi) "Don't Know."

In certain embodiments, clients can select the structure and presentation of questions to network users. Box 322 enables the client to interact with the interface to create a single question or a "table" of questions. If the client enters a value of 1 for "Number of Items" in box 322, a single question is created. For example, if the client selects the question type of "Agreement" and enters a value of 1 in box 324, the following question can be generated.

Using the scale below, please indicate how strongly you agree or disagree with the following statement: I enjoy sports.

○ Strongly Agree
○ Agree
○ Neither Agree nor Disagree
○ Disagree
○ Strongly Disagree If the client enters a value greater than 1 in box 322, a "table" with the specified number of items can be created and presented to network users. For example, if the client entered a value of 4 in box 322, the following table can produced.

| Using the scale to the right, please indicate how strongly you agree agree or disagree with the following statements: I enjoy | Strongly Agree | Agree | Neither Agree nor Disagree | Disagree | Strongly Disagree |
|---|---|---|---|---|---|
| Reading | ○ | ○ | ○ | ○ | ○ |
| Sleeping | ○ | ○ | ○ | ○ | ○ |
| Working | ○ | ○ | ○ | ○ | ○ |
| Exercising | ○ | ○ | ○ | ○ | ○ |

Tables enable network users to efficiently review and answer multiple items, reducing the amount of time and effort required to complete a set of questions or survey.

By selecting the value in box 324, clients may choose the presentation format of a question. For example, selecting a value of "Radio Button" in box 324, the following question format is presented to the network user.

Using the scale below, do you enjoy reading?
○ Yes
○ No

The same question is presented to network users in the following format if the client selected box 324 to be "Drop Down."

Using the scale below, do you enjoy reading?

| Click Here ▽ |
|---|
| Yes |
| No |

Enabling clients to select presentation formats makes surveys more versatile, user-friendly, and interesting for network users.

In certain embodiments, the client may include "branching" in defining the survey. The inclusion of branching in the survey allows for a different survey question to be presented based on previous response(s). For example, FIG. 4 illustrates example questions (402, 406, 410 and 414) that are associated with responses (404, 408, 412 and 416) respectively. By including branching in the survey, if in responding to question 402 a network user taking the survey selects the response option of "I do not read any newspapers" in response 404, then network user may next be presented with question 410 and with response 412. However, if the network user selects a response other than "I do not read any newspapers" then the network user may instead be presented with question 406 and response 408.

At any point while the client is defining the survey, the client has the option of editing, changing, adding, deleting, or reordering any of the previously entered questions, question types, or responses. Reordering enables the client to alter the sequence of questions within the survey, potentially providing a more logical flow within the survey or improving the quality of data provided by network users to eliminate bias or other influences that may adversely affect the survey results.

Clients have the ability to add multiple questions, one after the other, to define the survey. To help the client correctly define the survey, a "View Survey" option is contained on an interface that is provided to the client which allows the client to view how the completed survey will appear to a network user. In certain embodiments, the client can include graphical representations in defining the survey. For example, to enhance the appearance of the survey, the client may include pictures, drawings, sound, and animations. In certain embodiments, clients may include sound, video, or other "objects" that may engage network users or facilitate communication and interaction with network users.

Clients may develop and save multiple surveys. Each survey may be identified and named by the client. The definition and content of each survey may be maintained persistently across client invocations or log-ins. Furthermore, existing surveys or parts of surveys may be copied, renamed, or modified to create new surveys—expediting the survey development process for experienced clients.

Selecting a Target Group

Once the client is satisfied with the developed survey, a target group of network users must be selected for fielding the survey. In one embodiment, to aid the client in selecting the appropriate target group, the client is provided with a list of predefined target or network user groups. For example, a list of predefined target groups may include:

(i) children between the ages of 13 and 16
(ii) bicyclists
(iii) women who are pregnant
(iv) men over 45
(v) people who own computers In addition to the above examples, demographic, lifestyle, behavioral, and interest groups are provided to clients for selection and survey targeting. Clients may also define their own target group or select a representative sample from a myriad of populations.

For the survey to be fielded, the client must specify the number of completed surveys they require (i.e. the number of network users who complete the survey) and the timeframe for obtaining those completed surveys. In certain embodiments, the client is provided with a default or suggested number of completed surveys and timeframes. In one embodiment, the default or suggested number of completed surveys is based on the number of completed surveys that is typically requested or required in the field of market research.

In certain embodiments, the client is able to define a particular duration that the survey is to be "in the field." For example, the client may specify that the survey is to be fielded for two weeks. In another embodiment, the client may use a combination of completed surveys and duration to define how long the survey is to field. For example, the client may request that the survey field for six months or until 10,000 responses are received.

As described in detail below, the number of completed surveys requested and/or the duration that the survey is required to field (among other factors), will typically affect the price of the survey.

Providing Survey Result Data to the Client

When a survey is fielded to a particular target group, the results are gathered, processed, and analyzed to generate survey data that reflects the survey results. To enable the delivery of the survey data, the interface allows the client to specify an address for receiving the survey data. Using the specified address, the survey data may be provided to the client in a variety of formats. For example, in certain embodiments the survey data is provided to the client as a comma separated value file (CSVF) that is attached to an e-mail message and sent over the network system to the specified email addressee. In another embodiment, the survey results are provided to the client in spreadsheet formats that include automated data processing, analyzing, and charting scripts, software, or computer instructions.

In addition to delivering results, in certain embodiments, the client is provided with or allowed to access real-time results (i.e. information about the completed surveys received thus far). In one embodiment, real-time survey data is posted on a site connected to the network system that is accessible by the client.

Pricing Information

Prior to launching a survey, the client is presented with an interface indicating a price for fielding the survey and performing the requested service. Should the price be unacceptable, the client has the ability to iteratively alter the parameters of the survey to obtain an acceptable price. For example, FIG. 5 illustrates sample interface 500 that may be presented to a client. In this example, interface 500 contains a survey price field 502 which indicates the price of the survey as currently defined. Interface 500 also contains a change question button 504, a change target button 506, a change complete button 508 and a survey wizard button 510.

By selecting the change button 504, the client is presented with an interface that allows them to add, delete and modify questions that are used in defining the survey. Selecting the change button 506 provides the client with an interface that allows them to change or modify the target group that has been associated with the survey. Selecting the change complete button 508 provides the client with an interface that allows them to change the number of completed surveys previously requested by the client. Selecting the survey wizard button 510 provides the client with a guided, step-by-step sequence that can be used to create a survey.

Payment Information

As previously stated, the interface provides the client with the ability to securely enter payment information. Once the client defines the survey, selects a target group and determines the number of completed surveys and/or a duration for fielding the survey, a survey price is calculated and provided to the client through the interface.

Once a client accepts the price of the survey, the client selects a "pay for survey" button and enters pertinent payment information. For example, when a client chooses to proceed with the survey, an interface is provided to the client allowing the client to select a particular form of payment (i.e. credit card, debit card, etc.). In certain embodiments, a client is allowed to enter a customer account number that corresponds to an account or credit line that was previously established.

Screening Requested Surveys

Prior to launching a survey, the automatic survey mechanism has the ability to review and screen surveys to ensure their appropriateness for fielding to network users. In certain embodiments, an automated review of the survey is conducted by comparing components of the survey with a database of prohibited words, phrases, pictures, sounds, or themes. In one embodiment, surveys are automatically provided to an individual who is responsible for reviewing the appropriateness of the survey contents. Once a survey is approved, banners are launched and the survey is fielded.

Generating the Survey

After a client selects the pay button, enters valid payment information, and agrees to the terms and conditions associated with using the automatic survey mechanism, the automated survey mechanism determines the particular location (controlled by the automated survey system) where the survey will reside on the network. The automated survey mechanism then generates a survey based on the information (survey definition) supplied by the client and places it at the identified location. In certain embodiments, the generated survey consists of one or more HTML pages that are accessible over the Internet or Intranets to network users wanting to take the survey.

In addition to generating and storing the survey, the automated survey mechanism generates response validation rules that are automatically enforced. These rules provide a mechanism for validating the responses from network users input as they participate in a survey. In certain embodiments, the response validation rules are linked to the survey to ensure the data provided by a network user is logically valid and consistent with questions in the survey. The response validation rules can be used to increase the quality of the survey data that is provided to the client. In certain embodiments, errors or logical inconsistencies that are identified are reported to the network user thus enabling them to take correct action (i.e. enter valid information).

Additionally, the automated survey mechanism identifies and designates a specific storage unit for storing survey results. A storage unit is linked to each survey and is used to automatically capture survey results from network users who participate in the survey. In certain embodiments a unique storage unit is used to store the results for a particular survey. For example, when a survey is generated, a unique storage unit is identified and attached to the survey such that the results from a network user completing the survey are automatically stored into the unique storage unit. In certain embodiments, the storage unit is a database that can be used to store the survey results that were generated by participating network users.

Fielding the Survey and Launching a Banner

To attract network users of the desired target group to participate in the survey, the automated survey mechanism causes a banner or other recruitment device to be placed, launched, or made available for viewing on a one or more sites on the network system. In certain embodiments, the particular sites for viewing a banner associated with a particular survey are selected based on the target group information that was previously supplied by the client. For example, if the client specified that the target group for a particular survey would be kids 13–18 years of age, then sites associated with this target group are selected as banner locations for the particular survey.

In one embodiment, the automated survey mechanism maintains a static mapping between banner locations and targeted groups. The automated survey mechanism uses this static mapping to identify one or more locations for launching a banner on the network system. For example, a static mapping may exist between a target group of kids 13–18 years of age and specific portions of the Yahoo! site or other "kid-related" locations. Based on this static mapping, those specific portions of the Yahoo! site may be selected as banner locations for a survey targeted for kids 13–18 years of age.

In certain embodiments, a dynamic mapping between target groups and network users is performed by (1) acquiring data that identifies a network user (i.e., name, social security number, etc.), (2) locating within an information repository or database prior information that was obtain about the network user, (3) determining a target group to which the network user belongs based on the information in the repository, and (4) delivering to the network user a Web page that has a banner for a survey targeted to a group to which the network user belongs.

For example, when a network user requests a Web page, the request may contain data (e.g. from a cookie) that identifies the user as John Smith. The host or a process that is linked to the Web page may respond by searching a database for previously gathered information about John Smith. Assume that the database contains information indicating that John Smith is male and 47 years old. Based on this information, it is determined that John Smith falls into the target group of a survey for men over the age of 45. Therefore, a banner for that particular survey is placed in the Web page that is returned to John Smith in response to his request.

Banners can either be statically or dynamically created. In one embodiment, the automatic survey mechanism dynamically creates a particular banner using the target group information that was supplied by the client while defining the survey. The automated survey mechanism then requests the owner of the identified site(s) to launch the dynamically created banner.

In one embodiment, the automated survey mechanism causes a static or predefined banner to be launched at the identified site(s). The static or predefined banner may be maintained by either the site owner(s) or by the automatic survey mechanism. In other embodiments, banners are launched by sending a message to the owner or representative of the identified site(s), requesting that a banner be launched.

Each banner that is launched contains a reference (e.g. hypertext link) to a corresponding survey. Thus, by selecting a particular banner, network users are automatically presented with a corresponding survey. For example, by selecting a particular banner, a network user may be presented with the sample survey as previously described in FIG. 4.

In certain embodiments, network users are requested to enter information about themselves (i.e., age, occupation, etc.) within the banner or recruiting document itself. Using this information, a survey is dynamically identified and presented to the network user. By dynamically identifying a particular survey based on the attributes of a network user, an appropriate survey can be presented to the network user, thus potentially increasing the efficiency of the overall system. For example, if a network user "Tom" selects a particular banner, Tom is prompted to enter certain information about himself (i.e. age and gender). If Tom enters an age of 25 and a gender of male, he is requested to complete a survey that requires males that are 25 or older.

In certain embodiments, banners for a survey that correspond to a specific target group are placed on a general-purpose site (i.e. Yahoo!, AOL, Excite, USA Today, etc.). These banners contain information that specifies the desired target group of network users that are requested to complete the survey. (e.g. "if you are a male over 45, click here")

In certain embodiments, the banner contains information that attempts to attract users of the network system to participate in the survey. For example, a particular banner may state that by participating in the survey, network users are automatically entered into a drawing or sweepstakes for a vacation to Hawaii. Similarly, the banner may also state that network users who complete the survey may receive cash or other forms of incentives.

To reward a network user for completing a survey, the network user may be required to enter certain pertinent information (participant information). For example, if a banner offers Internet account credits for completing a survey, the network user may be required to provide their Internet account number so that they may be credited for participating in the survey.

Because meaningful survey results typically require opinions from a non-biased population, the automatic survey mechanism attempts to prohibit network users from participating in a particular survey multiple times. In one embodiment, the automatic survey mechanism uses cookie information to identify computers that were previously used to complete a particular survey. For example, when a network user completes a survey, cookie information is stored on the computer that identifies the computer as one that has previously been used to participate in the particular survey. Thereafter, when a network user attempts to participate in a particular survey using the same computer, the network user is denied access to the survey. In an alternative embodiment, the automatic survey mechanism maintains previously entered participant information that can be used to identify network users who have previously completed a particular survey.

After the required number of completed surveys is obtained, or the duration for fielding the survey has expired, access to the survey is disabled. The owners of the sites where the corresponding banner was launched are notified that the banner should be removed. Upon receiving the notice, the owner removes the banner from the site or prevents the banner from being displayed, thus eliminating access to the survey by network users.

Gathering and Analyzing Survey Results

After a banner is launched, network users may click on the banner to participate in the survey. When a network user completes a survey, the results are automatically sent over the network system where they are validated and stored in a corresponding storage unit (e.g. database) using the validation and insertion commands that are attached to the survey.

After each response for a particular survey is inserted into the appropriate database, a counter for that particular survey is incremented. If the counter for the survey equals the number of responses requested by the client, the owner of the site on which the banner was launched is notified that the banner should be removed. The results are then processed and analyzed to generate survey data and charts reflecting the gathered survey results. Processing and analysis of the collected data may include, for example, the extraction of the survey data from the database and the creation of cross-tabulations and graphical charts. Once the processing is complete, the survey data is sent to the address that was previously specified by the client while defining the survey.

In certain embodiments, survey results are analyzed on a periodic basis to generate realtime survey data. For example, in one embodiment, the automated survey mechanism generates real-time survey data by causing the survey results for a particular survey to be analyzed on a daily basis. The real-time survey data is then posted at a particular site on the network that can be accessed by the client. This allows the client to obtain survey data while the survey is still being fielded to users of the network system.

The Automated Survey Process

Figure 6:
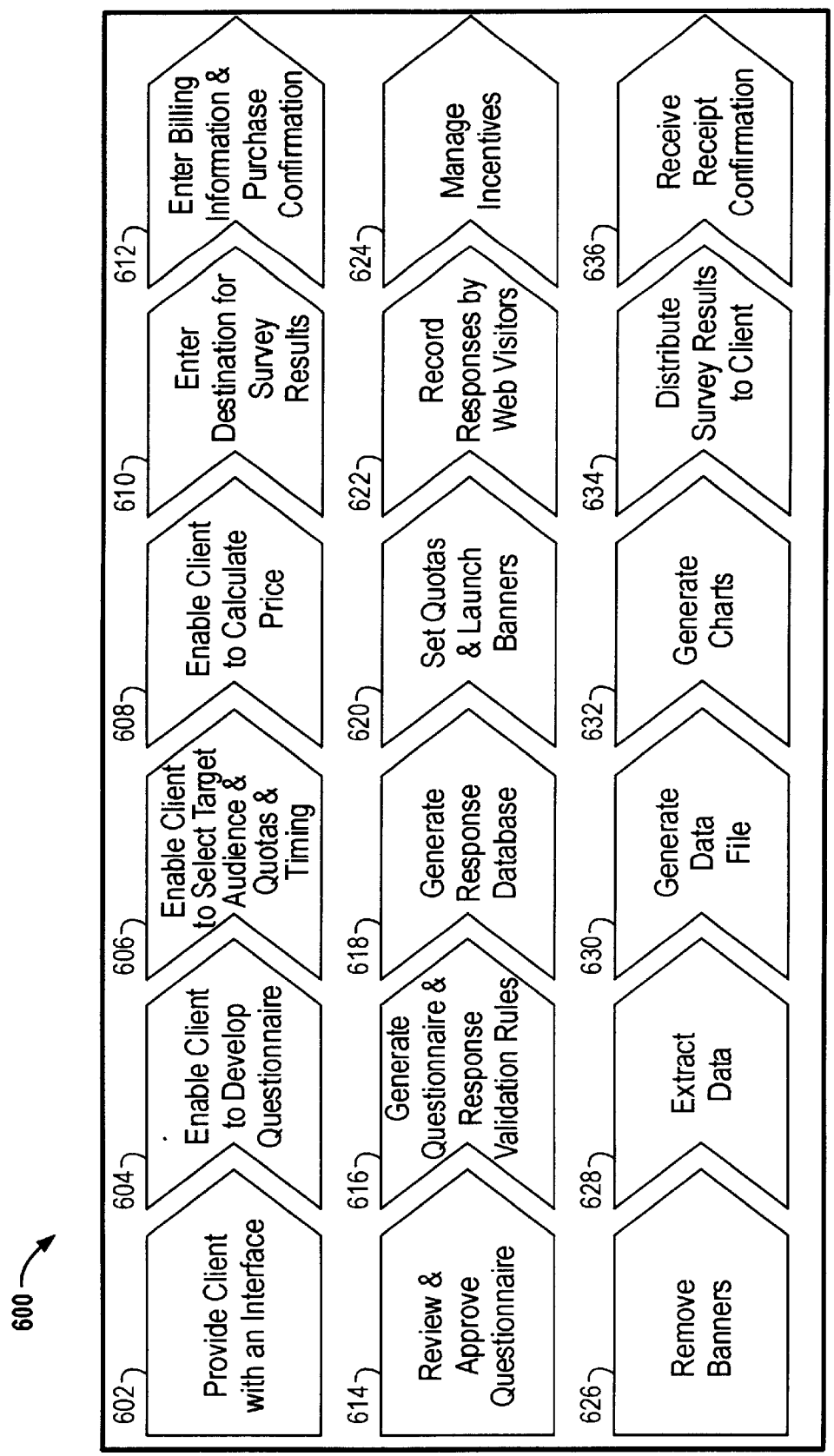
FIG. 6 illustrates a flow diagram for automating a survey over a network system in accordance with the present invention.

FIG. 6 illustrates a flow diagram for automating a survey over a network in accordance with an embodiment of the invention. At step 602, an automatic survey system generates interface data that defines an interface. The automatic survey system then causes the interface to be displayed on a client's display unit. At step 604, the client interacts with the interface to define a survey. By interacting with the interface, the client can define questions, select responses, edit, reorder, and view the survey.

At step 606, the client selects a target group of network users who are to take and complete the survey. During this step, the client also specifies the number of desired completed surveys and/or the duration the survey is to field. At step 608, the client interacts with the interface to identify the price of the survey based upon the parameters provided by the client in previous steps.

At step 608, the client has the capability of returning to steps 602 through 606 to modify the requested survey parameters to produce a survey price that is acceptable to the client.

At step 610, the client uses the interface to provide an address to define where the survey results are to be delivered. At step 612, the client uses the interface to securely provide billing information and to provide final approval to proceed with survey fielding.

At step 614, the survey created by the client is reviewed and screened for propriety. At step 616, the automated survey system generates a survey based on the parameters and data provided by the client. At this step, response validation rules and insertion commands are created and attached to the survey. At step 618, an information repository such as a database is created to store survey results from network users.

At step 620, quotas or the number of completed surveys requested by the client are attached to the database. The automatic survey mechanism then fields the survey by causing one or more banners to be launched, activated, or displayed on one or more sites on the network system.

At step 622, survey responses from network users participating in the survey are captured and inserted into the information repository or storage unit. At step 624, compensation or incentives are managed for network users who complete the survey.

At step 626, the banners are removed from the sites on the network system once the number of desired completed surveys has been achieved. At this step, the automatic survey system sends messages to all appropriate sites indicating the banner should no longer be displayed.

At step 628, the survey results provided by network users are extracted from the storage device. At step 630, the extracted survey results are processed, analyzed, and formatted using common file formats. At step 632, graphical representations of the survey results are generated and inserted into the survey data file.

At step 634, the file containing the results of the survey are sent to the address that was previously provided by the client. At step 636, a receipt confirmation is received from the client indicating the file containing the survey results has been received.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for providing an automated survey mechanism over a network system, the method comprising the steps of:

causing an interface to be displayed at a particular client of said network system, wherein the interface allows a user of said particular client to define a survey;

creating, at a server that is remotely located from said particular client, a survey that is based on information received in response to said user interacting with said interface;

wherein the automated survey mechanism automatically fields the survey;

wherein the step of automatically fielding the survey performed by the automated survey system includes identifying one or more target locations on said network, wherein said one or more target locations are associated with one or more target resources; and inviting participation in said survey by causing one or more links to said survey to be embedded in said one or more target resources to allow users of said network to request participation in said survey by accessing one of said target resources over said network and activating said link in said one of said target resources.

2. The method of claim 1 further comprising the step of gathering results of said survey over said network.

3. The method of claim 2 further comprising the step of providing, to said particular client over said network system, data that reflects said results.

4. The method of claim 3, wherein the step of providing data that reflects said results includes the steps of delivering to said particular client over said network system a set of compiled statistics based on said survey results.

5. The method of claim 3, wherein the step of providing data that reflects said results includes the step of posting the data at one or more particular locations on the network system, wherein the particular client can access information located at the one or more particular locations.

6. The method of claim 3, wherein the step of providing data that reflects said results includes the steps of emailing the results to said particular client over said network system.

7. The method of claim 1, wherein:

the step of identifying one or more target locations includes the step of identifying a group of network users who should take the survey; and the step of inviting participation in said survey includes the step of requesting that a banner that is linked to the survey be launched at one or more particular locations that are selected based on the identified group of users.

8. The method of claim 1, wherein the step of inviting participation in the survey includes the steps of:

identifying a group of users that should take the survey;

defining a banner based on the identified group, wherein the banner solicits the group of users to participate in the survey; and determining one or more locations on the network system to launch the banner.

9. The method of claim 1 wherein the step of causing an interface to be displayed includes the step of sending interface data over said network to said particular client from said server in response from a request from said client.

10. The method of claim 9, wherein the step of sending interface data that specifies the interface includes the step of sending interface data that contains one or more question types, wherein said user of said particular client may define the survey by selecting questions from the one or more question types.

11. The method of claim 9, wherein the step of sending interface data that specifies the interface further includes the step of allowing said user of said particular client to define a survey response number, wherein the survey response number represents a specific number of people that the particular client requires to respond to the survey.

12. The method of claim 9, wherein the step of sending interface data that specifies the interface further includes the step of allowing said user of said particular client to define a survey response time, wherein the survey response time represents a specific duration that the survey is to be fielded over the network.

13. The method of claim 9, wherein the step of sending interface data that specifies the interface further includes the step of allowing said user of said particular client to define a particular target group, wherein the particular target group identifies a group of users that the particular client would like to respond to the survey.

14. The method of claim 1, wherein the step of creating the survey includes the step of creating the survey as one or more electronic document pages, wherein network users may interact with the electronic document pages to participate in the survey.

15. The method of claim 1, wherein the step of inviting participation in the survey includes the steps of:

receiving, from the particular client, data that specifies a particular set of criteria; and attaching, to Web pages that have content of particular interest to network users that satisfy said particular set of criteria, a link to said survey.

16. The method of claim 1, wherein the step of creating the survey includes the step of dynamically generating a survey price, wherein the survey price is based upon survey parameters selected by the particular client.

17. The method of claim 1, wherein the step of inviting participation in the survey includes the steps of:

identifying a group of network users who should take the survey; and offering an incentive for network users in the identified group to participate in the survey.

18. The method of claim 1, wherein the step of inviting participation in the survey includes the steps of:

identifying a group of network users who should take the survey; and automatically distributing incentives to network users in the identified group who participate in the survey.

19. The method of claim 1, wherein the step of inviting participation in the survey includes the steps of:

examining the number of responses received from a group of network users who should take the survey;

determining if additional responses from the group of network users who should take the survey are required; and if no additional responses are required, then requesting that banners that are linked to the survey be removed from the network system.

20. A computer-readable medium carrying one or more sequences of one or more instructions for providing an automated survey mechanism over a network system, the one or more sequences of one or more instructions including instructions which, when executed by one or more processors, cause the one or more processors to perform the steps of:

causing an interface to be displayed at a particular client of said network system, wherein the interface allows a user of said particular client to define a survey;

creating, at a server that is remotely located from said particular client, a survey that is based on information received in response to said user interacting with said interface;

wherein the automated survey mechanism automatically fields the survey;

the step of automatically fielding the survey performed by the automated survey system includes identifying one or more target locations on said network, wherein said one or more target locations are associated with one or more target resources; and inviting participation in said survey by causing one or more links to said survey to be embedded in said one or more target resources to allow users of said network to request participation in said survey by accessing one of said target resources over said network and activating said link in said one of said target resources.

21. A computer system for providing an automated survey mechanism over a network system, the computer system comprising:

a memory;

one or more processors coupled to the memory; and a set of computer instructions contained in the memory, the set of computer instructions including computer instructions which when executed by the one or more processors, cause the one or more processors to perform the steps of:

causing an interface to an automated survey mechanism to be displayed at a particular client of said network system, wherein the interface allows a user of said particular client to define a survey;

in response to the user interacting with said interface displayed at said particular client, automatically performing the steps of creating, at a server that is remotely located from said particular client, a survey that is based on information received in response to said user interacting with said interface;

automatically fielding the survey using said automated survey mechanism, including identifying one or more target locations on said network, wherein said one or more target locations are associated with one or more target resources; and inviting participation in said survey by causing one or more links to said survey to be embedded in said one or more target resources to allow users of said network to request participation in said survey by accessing one of said target resources over said network and activating said link in said one of said target resources.

22. A method for providing an automated survey mechanism over a network system, the method comprising the steps of:

causing an interface to be displayed at a particular client of said network system by sending interface data from a server over said network system to said particular client, wherein the interface allows a user of said particular client to define a survey;

in response to a user interacting with said interface displayed at said particular client, the automated survey mechanism automatically performing the steps of creating the survey based on information from said interface;

selecting a target group for requesting participation in said survey;

based on said target group, identifying a web site for including a link to said survey; and causing a link to said survey to be inserted at said web site.

23. The method of claim 22 further comprising the step of providing, to said particular client over said network system, data that reflects results from respondents in said group of target users.

24. A method for providing an automated survey mechanism over a network system, the method comprising the steps of:

causing an interface to be displayed at a particular client of said network system, wherein the interface allows a user of said particular client to define a survey and to specify a target group for participating in the survey without identifying individual members of said target group, and a desired number of responses from said target group;

in response to a user interacting with said interface displayed at said particular client, automatically performing the step of creating the survey based on information received from said interface;

wherein the automated survey mechanism performs the steps of inserting a link to said survey in a resource that is accessible over said network, gathering results of said survey from respondents in said target group; and removing said link to said survey in said resource in response to receiving said desired number of responses from said target group.

25. The method of claim 24 further comprising the step of providing, to said particular client over said network system, data that reflects said results.

26. A computer-readable medium carrying one or more sequences of one or more instructions for providing an automated survey mechanism over a network system, the one or more sequences of one or more instructions including instructions which, when executed by one or more processors, cause the one or more processors to perform the steps of:
  causing an interface to be displayed at a particular client of said network system by sending interface data from a server over said network system to said particular client, wherein the interface allows a user of said particular client to define a survey;
  in response to a user interacting with said interface displayed at said particular client, automatically performing the steps of
    creating the survey based on information from said interface;
    selecting a target group for requesting participation in said survey;
    based on said target group, identifying a web site for including a link to said survey; and
    causing a link to said survey to be inserted at said web site.

27. The computer-readable medium of claim 26 further comprising instructions for performing the step of providing, to said particular client over said network system, data that reflects said results.

28. A computer-readable medium carrying one or more sequences of one or more instructions for providing an automated survey mechanism over a network system, the one or more sequences of one or more instructions including instructions which, when executed by one or more processors, cause the one or more processors to perform the steps of:
  causing an interface to be displayed at a particular client of said network system, wherein the interface allows a user of said particular client to define a survey and to specify a target group for participating in the survey without identifying individual members of said target group, and a desired number of responses from said target group;
  in response to a user interacting with said interface displayed at said particular client, automatically performing the steps of
    creating the survey based on information received from said interface;
    inserting a link to said survey in a resource that is accessible over said network,
    gathering results of said survey from respondents in said target group; and
    removing said link to said survey in said resource in response to receiving said desired number of responses from said target group.

29. The computer-readable medium of claim 28 further comprising instructions for performing the step of providing, to said particular client over said network system, data that reflects said results.

30. A computer system for providing an automated survey mechanism over a network system, the computer system comprising:
  a memory;
  one or more processors coupled to the memory; and
  a set of computer instructions contained in the memory, the set of computer instructions including computer instructions which when executed by the one or more processors, cause the one or more processors to perform the steps of:
    causing an interface to be displayed at a particular client of said network system by sending interface data from a server over said network system to said particular client, wherein the interface allows a user of said particular client to define a survey;
    in response to a user interacting with said interface displayed at said particular client, automatically performing the steps of
      creating the survey based on information from said interface;
      selecting a target group for requesting participation in said survey;
      based on said target group, identifying a web site for including a link to said survey; and
      causing a link to said survey to be inserted at said web site.

31. The computer system of claim 30 further comprising the step of providing, to said particular client over said network system, data that reflects said results.

32. A computer system for providing an automated survey mechanism over a network system, the computer system comprising:
  a memory;
  one or more processors coupled to the memory; and
  a set of computer instructions contained in the memory, the set of computer instructions including computer instructions which when executed by the one or more processors, cause the one or more processors to perform the steps of:
    causing an interface to be displayed at a particular client of said network system, wherein the interface allows a user of said particular client to define a survey and to specify a target group for participating in the survey without identifying individual members of said target group, and a desired number of responses from said target group;
    in response to a user interacting with said interface displayed at said particular client, automatically performing the steps of
      creating the survey based on information received from said interface;
      inserting a link to said survey in a resource that is accessible over said network,
      gathering results of said survey from respondents in said target group; and
      removing said link to said survey in said resource in response to receiving said desired number of responses from said target group.

33. The computer system of claim 32 further comprising the step of providing, to said particular client over said network system, data that reflects said results.

34. A method for dynamically selecting surveys for presenting to users of a network system, the method comprising the computer-implemented steps of:
  receiving, at an automated survey mechanism, data over said network system that is associated with user identification information that identifies a particular network user;
  retrieving previously stored characteristic information based on said user identification information;
  the automated survey mechanism determining a target group for said particular network user based on said previously stored characteristic information; and
  the automated survey mechanism inviting said particular network user to participate in a survey, wherein said survey includes content that is directed to individuals of said target group.

35. The method of claim 34 further comprising the steps of:
   collecting characteristic information about users of said network system; and
   maintaining a repository of said collected characteristic information for determining characteristic traits of users of said network system.

36. The method of claim 34 wherein the step of receiving data over said network system comprises the steps of receiving a request from said particular network user, wherein said request is associated with said user identification information.

37. The method of claim 36 wherein the step of receiving a request from said particular network user comprises the steps of receiving cookie information from said particular network user, wherein said cookie information includes said user identification information.

38. The method of claim 36 wherein the step of receiving a request from said particular network user comprises the steps of receiving a request for access to an electronic document associated with said network system.

39. The method of claim 34 wherein the step of inviting said particular network user to participate in a survey comprises the steps of transmitting to said particular network a web page that is associated with a banner that is linked to said survey.

40. The method of claim 34 wherein the step of inviting said particular network user to participate in a survey comprises the steps of transmitting electronic document information to said network user, wherein said electronic document information is associated with said survey.

41. A method for providing surveys over a network system, the method comprising the computer-implemented steps of:
   receiving, at an automated survey mechanism, from a network user a request for access to a resource that is associated with said network system;
   in response to receiving said request, transmitting from said automated survey mechanism data to said network user that includes one or more questions about said network user;
   receiving at said automated survey mechanism response data from said network user based on one or more response to said one or more questions from said network user;
   the automated survey mechanism dynamically selecting a survey for presenting to said network user based on said response data.

42. The method of claim 41 further comprising the step of transmitting survey data over said network system to present said survey to said network user.

43. The method of claim 41 wherein the step of receiving from a network user a request for access to a resource comprises the step of receiving a request for access to content within a web page that is associated with the network system.

44. The method of claim 41 wherein the step of receiving from a network user a request for access to a resource comprises the step of receiving a request for access to content that is associated with a banner that has been made available over said network system.

45. The method of claim 41 wherein the step of transmitting data to said network user that includes one or more questions about said network user comprises the step of transmitting interface data that causes an interface to be displayed to said network user, wherein said interface includes said one or more questions about said network user.

46. The method of claim 41 wherein the step of dynamically selecting a survey comprises the step of dynamically creating said survey based on said response data received from said network user.

47. A method for assigning a respondent to one or more target groups, the method comprising the computer-implemented steps of:
   receiving, at an automated survey mechanism, a request from said respondent, wherein the request is associated user identification information that identifies said respondent;
   the automated survey mechanism retrieving a set of characteristic information based on said user identification information; and
   the automated survey mechanism selecting a survey for presenting to said respondent based on said set of characteristic information.

48. A method for providing an automated survey mechanism over a network system, the method comprising the steps of:
   causing an interface to be displayed at a particular client of said network system, wherein the interface allows a user of said particular client to define a survey;
   in response to the user interacting with said interface displayed at said particular client, automatically performing the step of creating a survey at a server that is remotely located from said particular client based on information received over said network system from said interface;
   the automated survey mechanism identifying one or more target locations on said network, wherein said one or more target locations are associated with one or more target resources; and
   the automated survey system inviting participation in said survey by causing one or more links to said survey to be embedded in said one or more target resources to allow users of said network to request participation in said survey by accessing one of said target resources over said network and activating said link in said one of said target resources.

49. A method for inviting participation in surveys over a network system, the method comprising the steps of:
   causing an interface to be displayed at a particular client of said network system, wherein the interface allows a user of said particular client to define a survey;
   after causing the interface to be displayed, and in response to the user interacting with said interface displayed at said particular client, creating said survey at a server that is remotely located from said particular client based on information received over said network system from said particular client;
   reading electronic information for use in determining where to field surveys;
   after reading said electronic information, using the electronic information to request participation in said survey by one or more users; and
   after requesting participation in the survey, gathering results from participation in said survey by said one or more users.

50. The method of claim 49 further comprising the step of, after gathering the results, providing over said network system, data that reflects said results.

* * * * *